United States Patent
Ambrus et al.

(10) Patent No.: US 9,552,060 B2
(45) Date of Patent: Jan. 24, 2017

(54) RADIAL SELECTION BY VESTIBULO-OCULAR REFLEX FIXATION

(71) Applicant: Microsoft Technology Licensing, LLC, Redmond, WA (US)

(72) Inventors: Anthony J. Ambrus, Seattle, WA (US); Adam G. Poulos, Sammamish, WA (US); Lewey Alec Geselowitz, Redmond, WA (US); Dan Kroymann, Kirkland, WA (US); Arthur C. Tomlin, Kirkland, WA (US); Roger Sebastian-Kevin Sylvan, Seattle, WA (US); Mathew J. Lamb, Mercer Island, WA (US); Brian J. Mount, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 14/166,778

(22) Filed: Jan. 28, 2014

(65) Prior Publication Data
US 2015/0212576 A1 Jul. 30, 2015

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/012* (2013.01); *G06F 3/0482* (2013.01); *G06F 3/04842* (2013.01)

(58) Field of Classification Search
CPC ........ G06T 19/006; G06T 19/00; G06T 11/60; G09G 1/04; G09G 1/10; G09G 3/005; G06F 3/147; G02B 27/0103; G02B 5/32; G02B 27/2214; G02B 23/18
(Continued)

(56) References Cited

U.S. PATENT DOCUMENTS 5,742,264 A 4/1998 Inagaki et al.
2003/0210227 A1 11/2003 Smith
(Continued)

OTHER PUBLICATIONS

Nonaka, H. (2003), "Communication Interface With Eye-Gaze and Head Gesture Using Successive DP Matching and Fuzzy Inference", Journal of Intelligent Information Systems, 21(2), pp. 105-112.*

(Continued)

*Primary Examiner* — Xiao Wu
*Assistant Examiner* — Sarah Lhymn
(74) *Attorney, Agent, or Firm* — Brianna Hinojosa; Judy Yee; Micky Minhas

(57) ABSTRACT

Methods for enabling hands-free selection of objects within an augmented reality environment are described. In some embodiments, an object may be selected by an end user of a head-mounted display device (HMD) based on detecting a vestibulo-ocular reflex (VOR) with the end user's eyes while the end user is gazing at the object and performing a particular head movement for selecting the object. The object selected may comprise a real object or a virtual object. The end user may select the object by gazing at the object for a first time period and then performing a particular head movement in which the VOR is detected for one or both of the end user's eyes. In one embodiment, the particular head movement may involve the end user moving their head away from a direction of the object at a particular head speed while gazing at the object.

16 Claims, 12 Drawing Sheets

(51) Int. Cl.
*G06F 3/0484* (2013.01)
*G06F 3/0482* (2013.01)

(58) Field of Classification Search
USPC ........ 345/7, 8, 9, 30, 31, 32, 418, 619, 629,
345/632, 633; 359/13, 14, 15, 16, 19,
359/462, 473, 480, 481
See application file for complete search history.

(56) References Cited

U.S. PATENT DOCUMENTS

| | | | |
|---|---|---|---|
| 2005/0047629 A1* | 3/2005 | Farrell | G06F 3/013 382/117 |
| 2005/0280603 A1* | 12/2005 | Aughey et al. | 345/8 |
| 2006/0110008 A1* | 5/2006 | Vertegaal et al. | 382/103 |
| 2009/0110245 A1 | 4/2009 | Thorn | |
| 2009/0222149 A1 | 9/2009 | Murray et al. | |
| 2011/0221656 A1 | 9/2011 | Haddick et al. | |
| 2011/0234584 A1* | 9/2011 | Endo | 345/419 |
| 2012/0065549 A1 | 3/2012 | Shelhamer | |
| 2012/0081393 A1* | 4/2012 | Kim | 345/633 |
| 2012/0179636 A1 | 7/2012 | Galiana et al. | |
| 2012/0293548 A1* | 11/2012 | Perez et al. | 345/633 |
| 2013/0169532 A1* | 7/2013 | Jahnke | G06F 3/013 345/158 |
| 2013/0169533 A1 | 7/2013 | Jahnke | |
| 2013/0254716 A1 | 9/2013 | Mishra | |
| 2013/0328762 A1 | 12/2013 | McCulloch et al. | |
| 2014/0002444 A1 | 1/2014 | Bennett et al. | |
| 2014/0168056 A1* | 6/2014 | Swaminathan | G06K 9/00604 345/156 |

OTHER PUBLICATIONS

Laramee, R. S., & Ware, C. (2002), "Rivalry and Interference With a Head-Mounted Display", ACM Transactions on Computer-Human Interaction, 9(3), pp. 238-251.*
Huckauf, A., & Urbina, M. H. (2008), "On Object Selection in Gaze Controlled Environments", Journal of Eye Movement Research, 2(4), 4, pp. 1-7.*
Viirre, E., et al. "A reexamination of the gain of the vestibuloocular reflex." Journal of Neurophysiology56.2 (1986): pp. 4 39-450.*
Mardanbegi, et al., "Eye-based Head Gestures", In Proceedings of the Symposium on Eye Tracking Research and Applications, Mar. 28, 2012, 8 pages.
Allison, et al., "Combined Head and Eye Tracking System for Dynamic Testing of the Vestibular System", In IEEE Transactions on Biomedical Engineering, vol. 41, Issue 11, Nov. 1996, 10 pages.
Draper, Mark, "The Adaptive Effects of Virtual Interfaces: Vestibulo-Ocular Reflex and Simulator Sickness", Published on: Sep. 4, 2013, Available at: http://www.hitl.washington.edu/publications/r-98-22/ch2.html.
Omrcen, et al., "Redundancy Control of a Humanoid Head for Foveation and Three-Dimensional Object Tracking: A Virtual Mechanism Approach", in Advanced Robotics, vol. 24, Issue 15, Apr. 2, 2012, 27 pages.
"International Search Report and Written Opinion Issued in PCT Patent Application No. PCT/US2015/012551", Mailed Date: Apr. 23, 2015, 13 Pages.
Response to International Search Report and Written Opinion, dated Aug. 6, 2015, PCT Application PCT/US2015/012551.
"Second Written Opinion Issued in PCT Application No. PCT/US2015/012551", Mailed Date: Dec. 8, 2015, 8 Pages.
"International Preliminary Report on Patentability Issued in PCT Application No. PCT/US2015/012551", Mailed Date: May 18, 2016, 12 Pages.

* cited by examiner

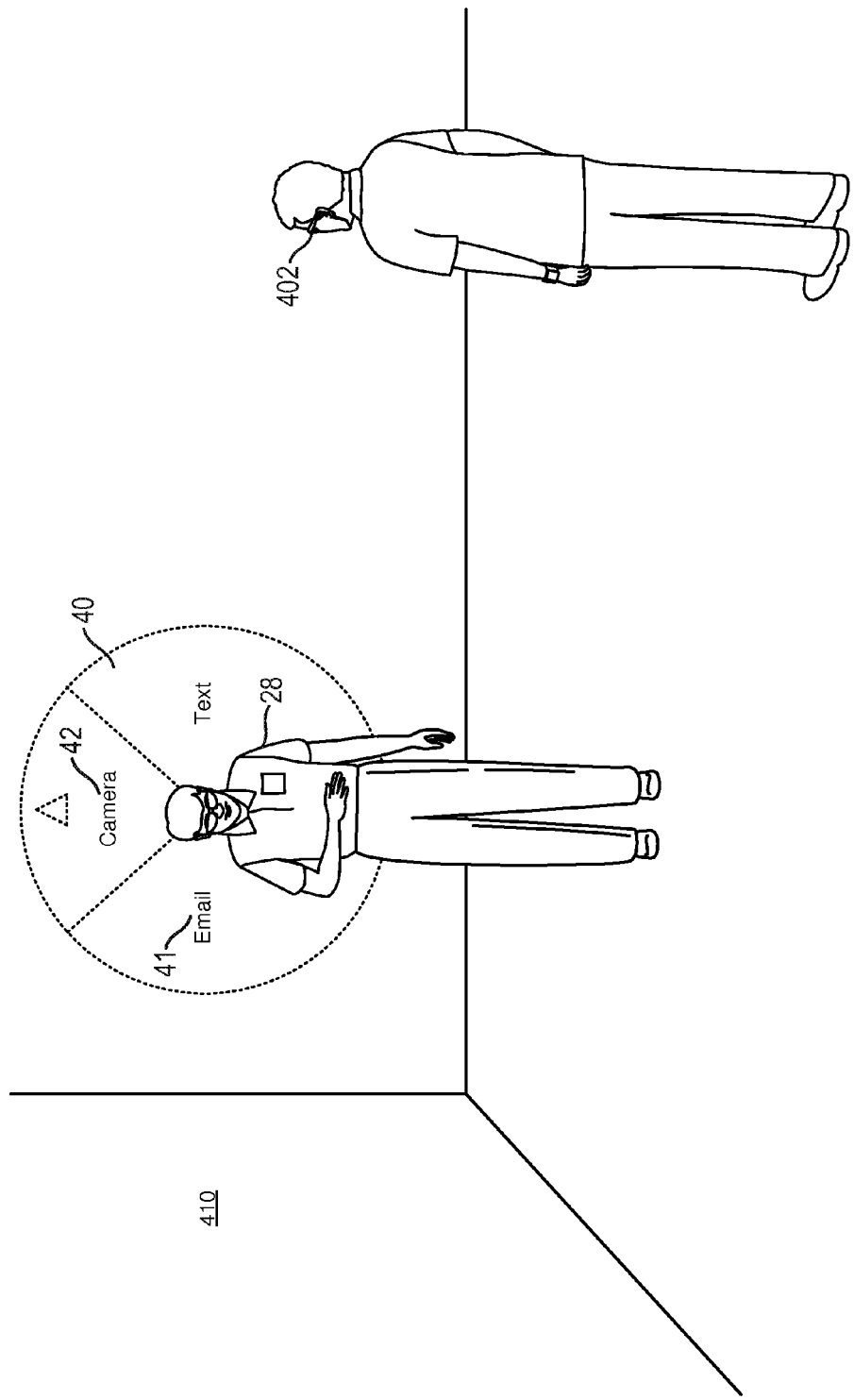

RADIAL SELECTION BY VESTIBULO-OCULAR REFLEX FIXATION

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for enabling hands-free selection of objects within an augmented reality environment. In some embodiments, an object may be selected by an end user of a head-mounted display device (HMD) based on detecting a vestibulo-ocular reflex (VOR) with the end user's eyes while the end user is gazing at the object and performing a particular head movement for selecting the object. The VOR may refer to a reflexive eye movement that stabilizes images on the retina during head movement by producing an eye movement in a direction opposite to the head movement. The object selected may comprise a real object or a virtual object within the augmented reality environment. The end user may select the object by gazing at the object for a first period of time (e.g., the end user may fixate on the object for three seconds) and then performing a particular head movement in which the VOR is detected for one or both of the end user's eyes. In one embodiment, the particular head movement may involve the end user quickly moving their head away from a direction of the object at a head speed that is greater than a threshold head speed while gazing at the object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A depicts one embodiment of an augmented reality environment as viewed by an end user of an HMD.

DETAILED DESCRIPTION

Figure 1:
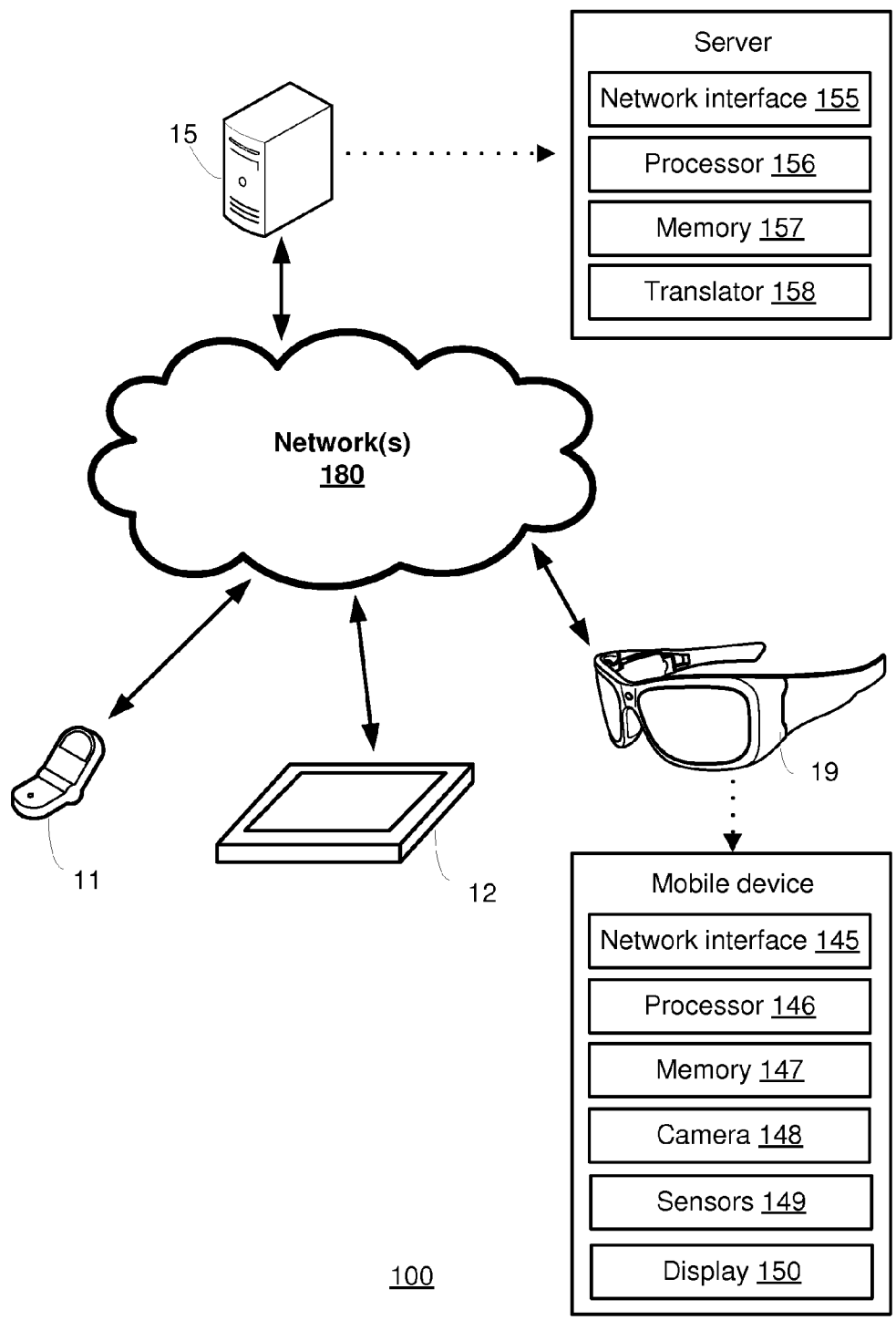
FIG. 1 is a block diagram of one embodiment of a networked computing environment in which the disclosed technology may be practiced.

Technology is described for enabling hands-free selection of objects within an augmented reality environment. In some embodiments, an object may be selected by an end user of a head-mounted display device (HMD) based on detecting a vestibulo-ocular reflex (VOR) associated with the end user's eyes while the end user is gazing at the object and performing a particular head movement for selecting the object (e.g., nodding or shaking their head while they are looking at the object). The object selected may comprise a real object (e.g., a person's face, a sign, or other physically detectable object within a real-world environment) or a virtual object (e.g., a virtual television or a virtual sticky note located on a real-world wall) within the augmented reality environment. The object selected may also comprise an image displayed to the end user using an electronic display (e.g., a tablet computer display). For example, the image displayed to the end user using the electronic display may comprise an image associated with opening a computing application, an electronic folder for storing files, or a live tile that displays real-time information associated with a computing application (e.g., a weather application or a news application). The end user may select the object by gazing at the object for a first period of time (e.g., the end user may fixate on the object for three seconds) and then subsequently performing a particular head movement in which the VOR is detected for one or both of the end user's eyes. In one embodiment, the particular head movement may involve the end user moving their head away from a direction of the object at a head speed that is greater than a threshold head speed while gazing at the object. In another embodiment, the particular head movement may involve the end user moving their head away from a direction of the object by at least a particular angle (e.g., more than ten degrees) within a particular period of time (e.g., 250 ms) while gazing at the object.

The vestibulo-ocular reflex (VOR) may refer to a reflexive eye movement that stabilizes images on the retina during head movement by producing an eye movement in a direction opposite to the head movement. The VOR may allow the fovea (located in the center of the macula region of the retina) to maintain its gaze on whatever target it is imaging by performing compensatory eye movements that are timed to coordinate with the movement of the head. As an example, if a person is reading a book while they are riding in a car, then due to the VOR, the person's eyes may reflexively move to compensate for head movements caused by bumps in the road in order to stabilize the person's view of the words being read in the book. The compensatory eye movements may include horizontal, vertical, and/or rotational eye movements.

In one embodiment, an object (e.g., a virtual object) may appear within a field of view of an end user's HMD. To select the object, the end user may gaze at the object for a first period of time (e.g., the end user may fixate on the object for two seconds) and then immediately perform a particular head movement while gazing at the object. In one example, the particular head movement may comprise the end user moving their head's orientation away from the direction of the object at a speed that is greater than a threshold speed while maintaining their gaze upon the object and then returning their head's orientation back to the direction of the object while maintaining their gaze upon the object. The particular head movement may comprise a quick nod or a horizontal head shake. As the end user's head orientation moves away from the direction of the object, a first VOR may be detected. Furthermore, as the end user's head orientation moves back towards the direction of the object, a second VOR may be detected. In this case, the presence of the first VOR and/or the second VOR may be used to detect that the end user is focusing on the object while performing the particular head movement.

If it is determined that the end user was focusing on a selectable object while performing a particular head movement for selecting the selectable object, then a selection of the selectable object may be detected. In some cases, upon selection of a selectable object within an augmented reality environment, additional information may be displayed to the end user in proximity to the selectable object. In one example, a selectable object may correspond with a computing application and the additional information may include a radial menu with various options, such as an option for displaying properties associated with the computing application, an application deletion option, or an application open option. In another example, a selectable object may correspond with a particular person (or the particular persons' face) and the additional information may include a radial menu with various options, such as an option to send a message to the particular person (e.g., an email message or a text message), an option to open a speech recognition application in order to compose a reminder message, or an option for taking a picture of the particular person.

In some cases, the first period of time prior to performing a particular head movement in which the end user gazes upon a selectable object in order to confirm their fixation may be set based on the size of the selectable object. As larger objects may be targeted more easily than smaller objects by the end user and smaller objects may be more prone to unintentional overshoot or misses by the end user, a larger fixation time may be used to confirm selection of the smaller objects. In one example, a smaller selectable object within an augmented reality environment occupying a viewing angle less than a threshold angle (e.g., less than two degrees) or less than a viewing area less than a threshold area (e.g., less than one square inch) may require a longer fixation time than a first period of time for a larger selectable object. In another example, if a selectable object fits within a circular area as viewed using an HMD (i.e., as viewed from the HMD, the selectable object is smaller than the circular area), then a longer fixation time than a first period of time for larger selectable objects may be used for determining that the end user has fixed their gaze upon the selectable object.

In one embodiment, a selectable object (e.g., a selectable real object or a selectable virtual object) may be selected by an end user if the end user gazes at the selectable object for a first period of time (e.g., for three seconds) and then subsequently performs a particular head movement during which a VOR is detected. In some cases, in order to compensate for distractions to the end user while they are focusing on the selectable object, the selectable object may remain selected as long as the cumulative time spent by the end user gazing at the selectable object is greater than a threshold over a particular period of time. In one example, the selectable object may remain selected as long as the end user gazes at the selectable object for at least 5 seconds over a 10 second period of time. In some cases, if the selectable object comprises a selectable virtual object, then once the virtual object is selected, then the end user may perform head gestures and/or hand gestures to adjust a location of the virtual object (e.g., by adjusting the location of the virtual object by keeping their eyes locked on the selectable object and moving their head).

In some embodiments, eye tracking may be used to determine a gaze vector associated with a gaze position and a gaze orientation for an end user of an HMD. The gaze vector may correspond with an object within an augmented reality environment being viewed by the end user. The gaze orientation may correspond with three angles (e.g., three Euler angles). Head tracking may be used to determine a head vector associated with a head position and a head orientation of the end users head within the augmented reality environment. The head vector may correspond with an orientation of the HMD within the augmented reality environment. In one embodiment, a VOR may be detected based on movement of a gaze vector (associated with movement of the end user's eyes) relative to a head vector (associated with movement of the end user's head).

In some cases, a gaze vector may correspond with an end user's dominant eye and the VOR may be detected for the end user's dominant eye. In other cases, a gaze vector may correspond with the end user's eye that is closest to a target object being viewed by the end user and the VOR may be detected for the end user's eye that is closest to the target object (e.g., if the target object is to the left of the end user, then the end user's left eye that is closer to the target object and has a reduced glancing angle compared with the end user's right eye may be analyzed for the VOR). In some cases, a first gaze vector associated with a left eye of the end user and a second gaze vector associated with a right eye of the end user may be combined using a weighted combination that weighs the gaze vector associated with the end user's eye that is closest to the target object more heavily than the gaze vector associated with the end user's eye that is farthest from the target object.

One issue involving the hands-free selection of an object by an end user of an HMD is that a false positive selection may occur since the selection area for the object and the identifying selection criteria (e.g., gazing at the object for a particular period of time) may occupy the same area within an augmented reality environment. For example, an end user of an HMD may unintentionally select an object including text (e.g., a virtual sign) while the end user is reading the text. One advantage of the disclosed technology is that the reliability of selecting objects using eye tracking and gaze tracking may be improved by taking into account the vestibulo-ocular reflex of the end user's eyes.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that provides an augmented reality environment including a virtual content reader. The virtual content reader may comprise a virtual object within the augmented reality environment in which content may be read by an end user of the HMD. In one embodiment, the virtual content reader may comprise a virtual object that appears fixed with respect to the end user's point of view (i.e., a head-locked virtual object). For example, the virtual content reader may appear in the top left corner of the end user's point of view regardless of how the end user turns their head. In another embodiment, the virtual content reader may comprise a virtual object that appears to maintain a coherent spatial relationship within the augmented reality environment (i.e., a world-locked virtual object). For example, as the end user turns their head or moves within the augmented reality environment, the images displayed to the end user on the HMD will change such that the virtual content reader appears to exist within the augmented reality environment at a particular location (e.g., on a wall).

In some embodiments, as an end user of an HMD moves within an augmented reality environment, virtual objects and/or real objects that are selectable by the end user may be highlighted as the end user moves their gaze within a viewing angle of the selectable objects. In one example, a selectable object within an augmented reality environment may display a highlighted border to the end user if a gaze vector associated with the end user is within a particular angle of the selectable object. The end user may then select the object (e.g., a real object or a virtual object) by gazing at the object for a first period of time (e.g., two seconds) and then performing a particular head movement while gazing at the object. In one example, the particular head movement may comprise the end user moving their head's orientation away from the direction of the object at a speed that is greater than a threshold speed while maintaining their gaze upon the object and then returning their head's orientation back to the direction of the object. The particular head movement may comprise a vertical head movement and/or a horizontal head movement. As the end users head orientation moves away from the direction of the object, a first VOR may be detected. As the end user's head orientation moves back towards the direction of the object, a second VOR may be detected. In this case, the detection of the first VOR and/or the second VOR may be used to detect that the end user was focusing on the object while performing the particular head movement and that the end user intends to select the object.

In some embodiments, an end user may select an object by gazing at the object for a first period of time (e.g., staring at a selectable real object for two seconds) and then performing a particular head movement while gazing at the object, wherein the type of particular head movement may determine a subsequent selection action. In one example, a vertical head movement may correspond with a first action (e.g., to launch a computer application associated with the object) and a horizontal head movement may correspond with a second action different from the first action (e.g., to dismiss selection of the object or to delete the object).

Figure 2A:
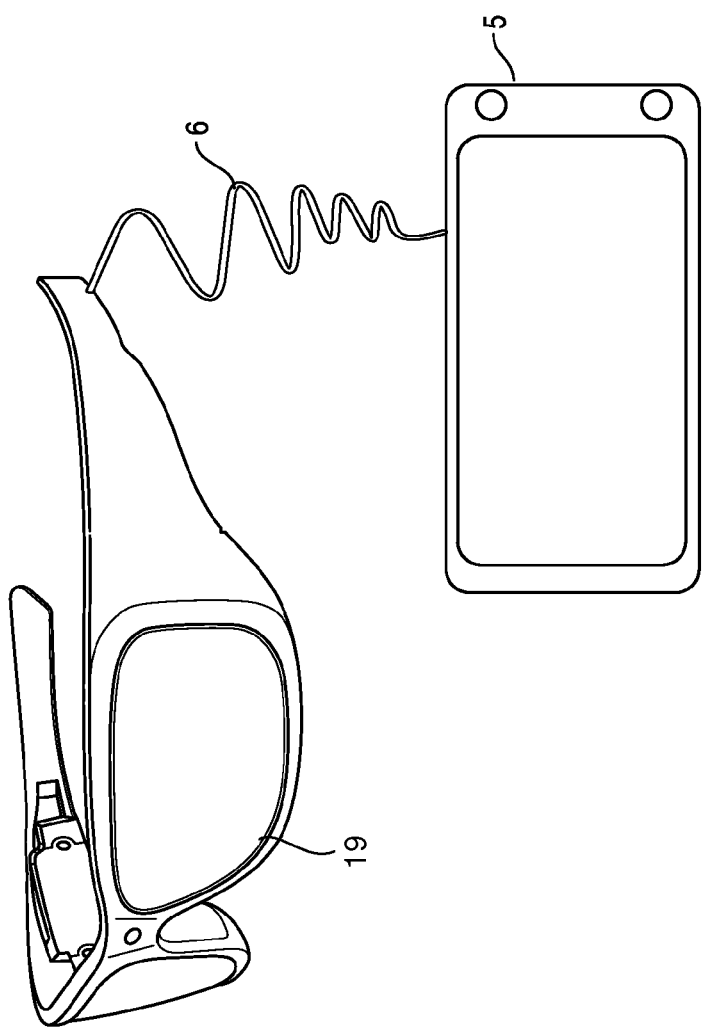
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

Figure 2B:
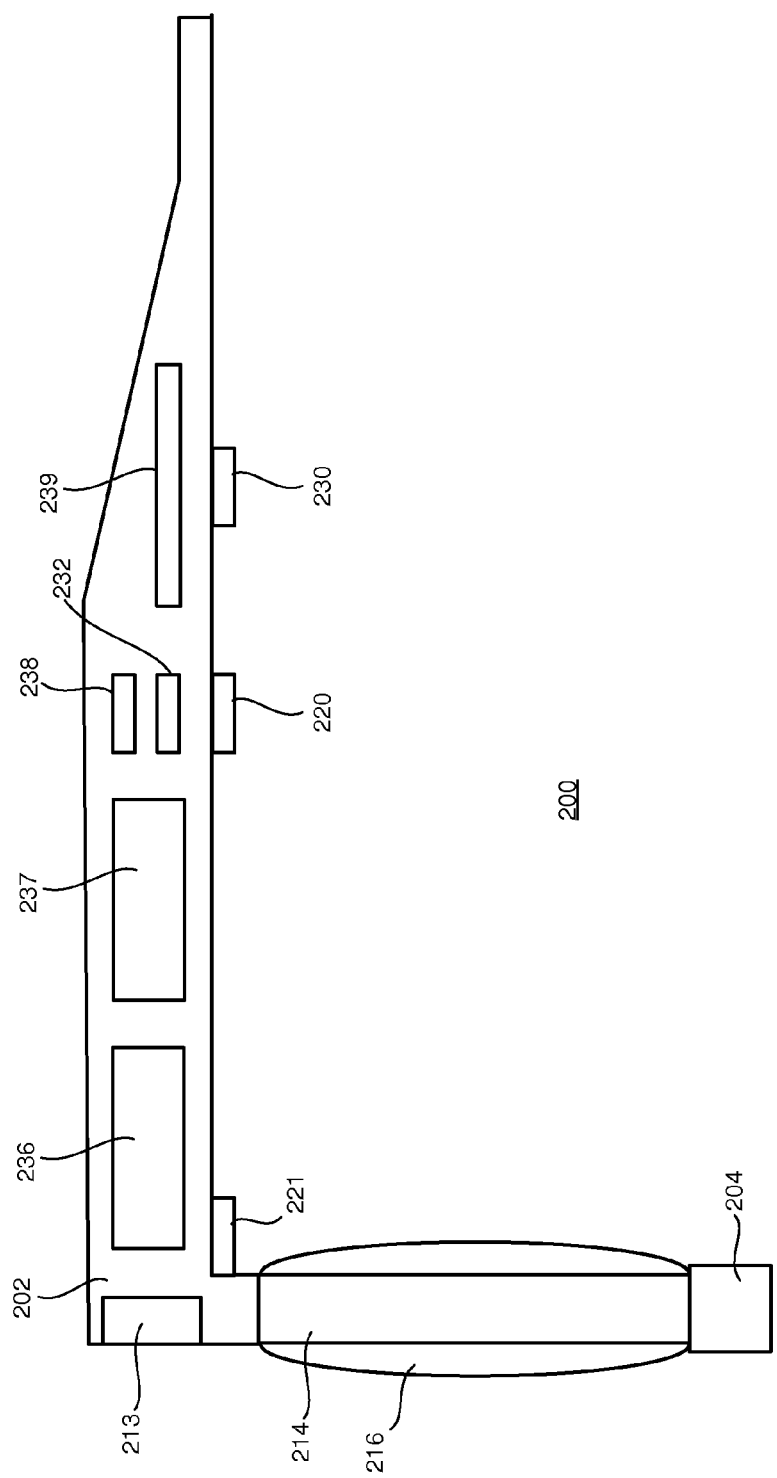
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
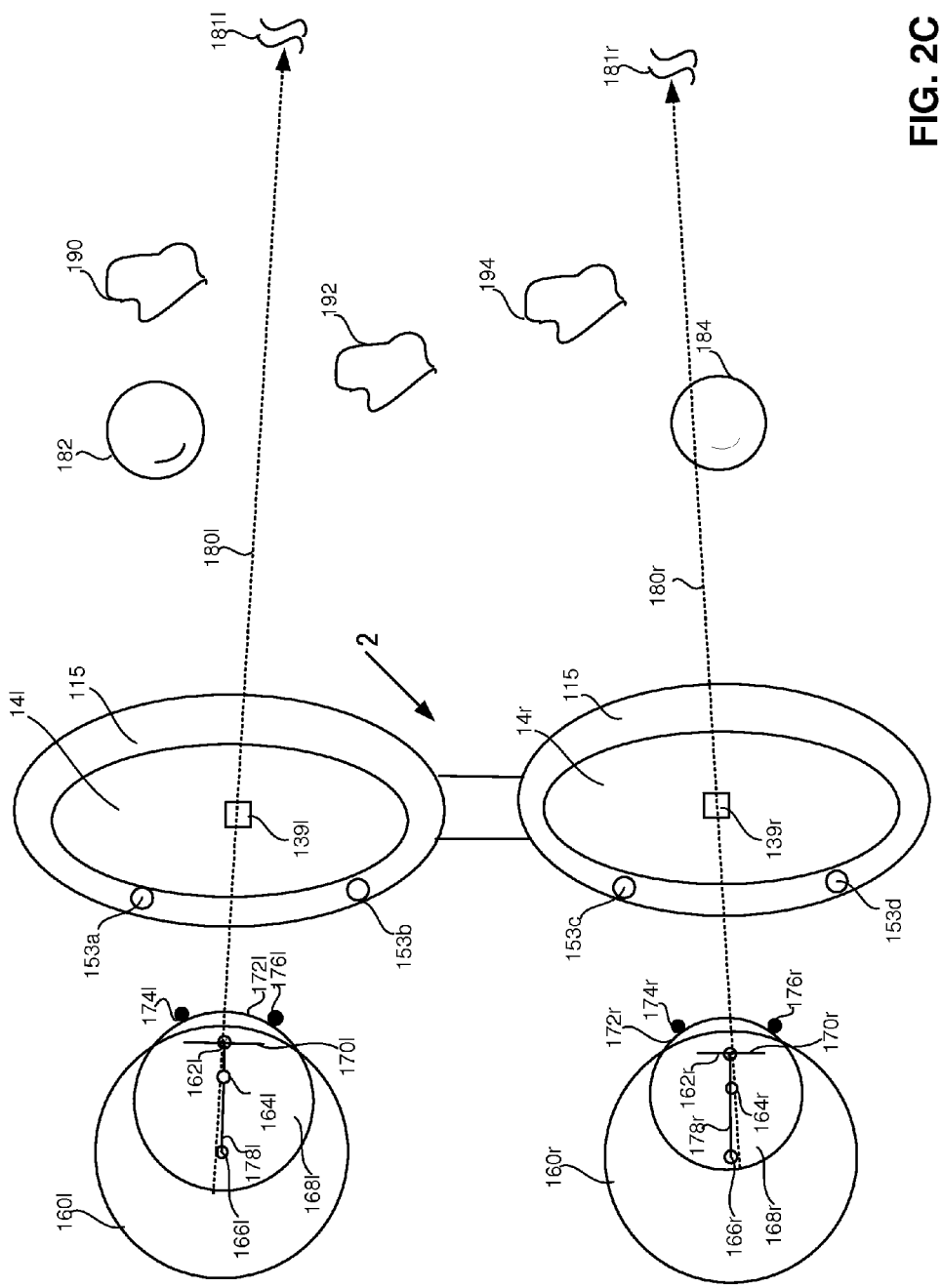
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
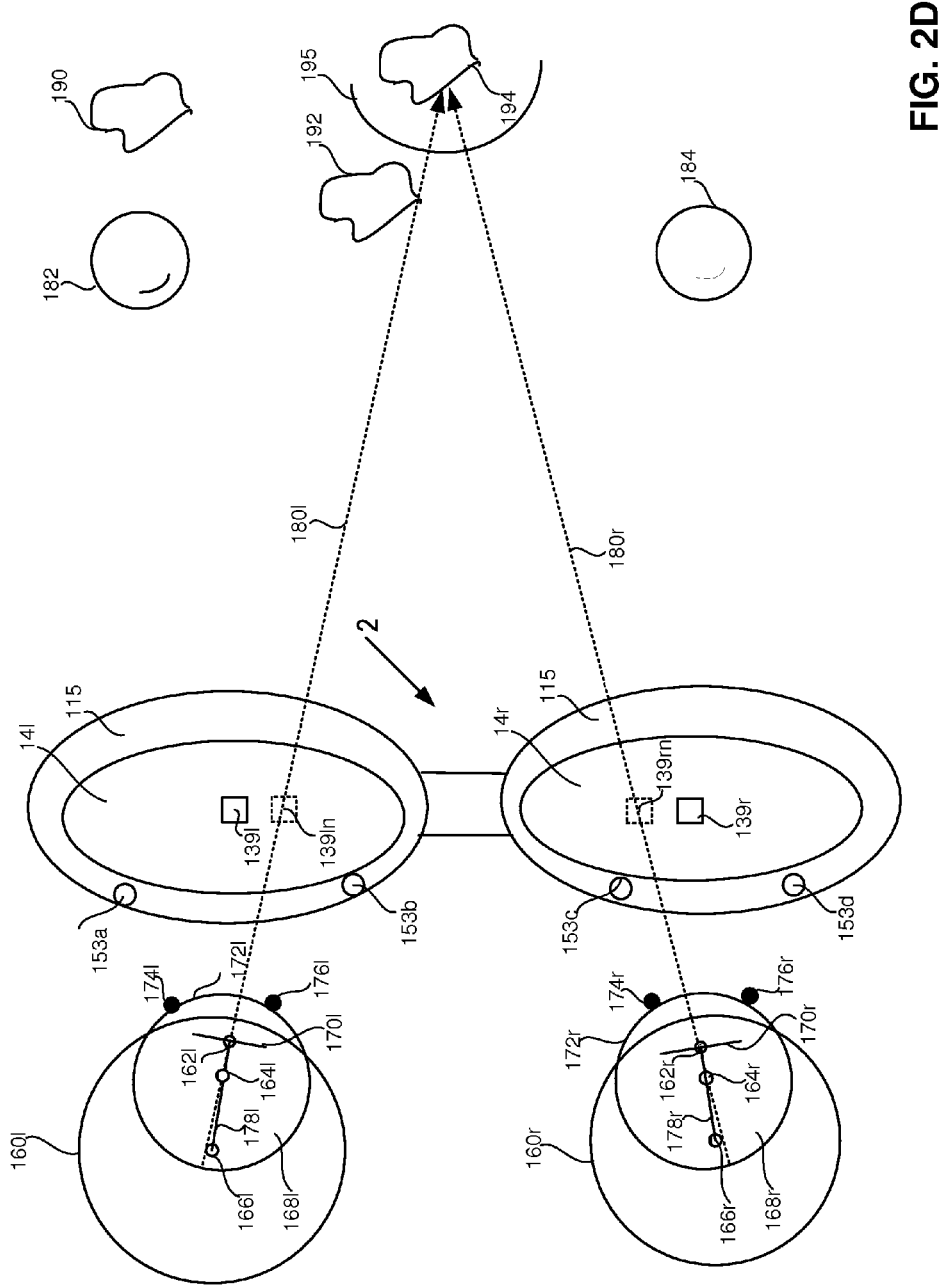
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 3A:
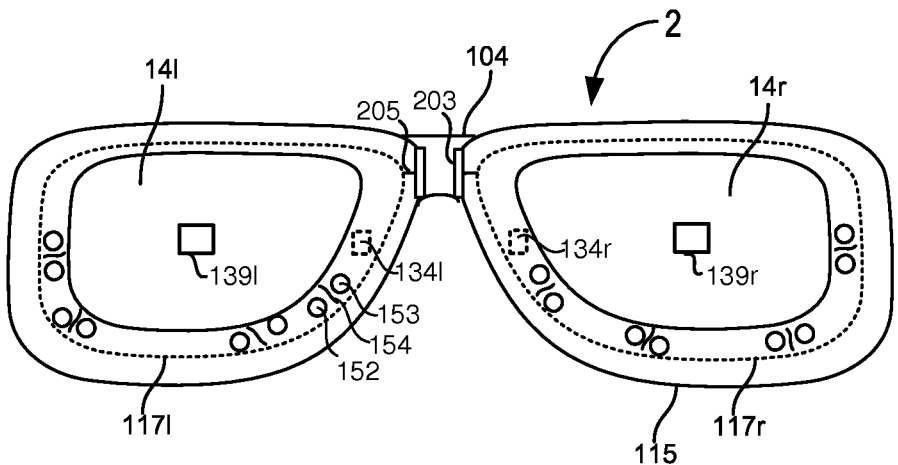
FIG. 3A depicts one embodiment of a portion of an HMD with movable display optical systems including gaze detection elements.

FIG. 3A depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 3A, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 3A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 3A, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 3B:
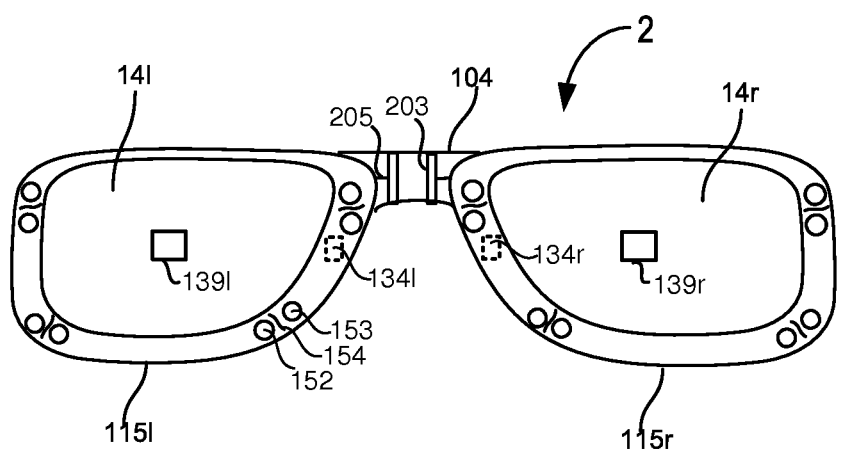
FIG. 3B depicts an alternative embodiment of a portion of an HMD with movable display optical systems including gaze detection elements.

FIG. 3B depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

FIG. 4A depicts one embodiment of an augmented reality environment 410 as viewed by an end user of an HMD 402. The HMD 402 may comprise a mobile device, such as mobile device 19 in FIG. 1. The augmented reality environment 410 may include a radial menu 40 placed around (or in front of) a selectable object within the augmented reality environment 410. As depicted, the selectable object comprises a person 28. The selectable objects within an augmented reality environment may include real objects, such as a real television or a real electronic display, and virtual objects, such as a virtual television or a virtual electronic display. The radial menu 40 displays various options associated with the selectable object. As depicted, the radial menu 40 includes a first option 42 corresponding with a camera application for taking pictures or capturing images of the selectable object and a second option 41 corresponding with an email application for sending a message to the person 28. The end user of the HMD 402 may use head movements and/or eye movements in order to control the radial menu 40 and to select one of the various options displayed by the radial menu 40.

In one embodiment, once a radial menu has been placed in front of a selectable object, a gaze region corresponding with gazing at the selectable object may be enlarged to encompass both the selectable object and the radial menu. In this case, the radial menu may be displayed as long as an end user of an HMD gazes at either the selectable object or the radial menu.

Figure 4B:
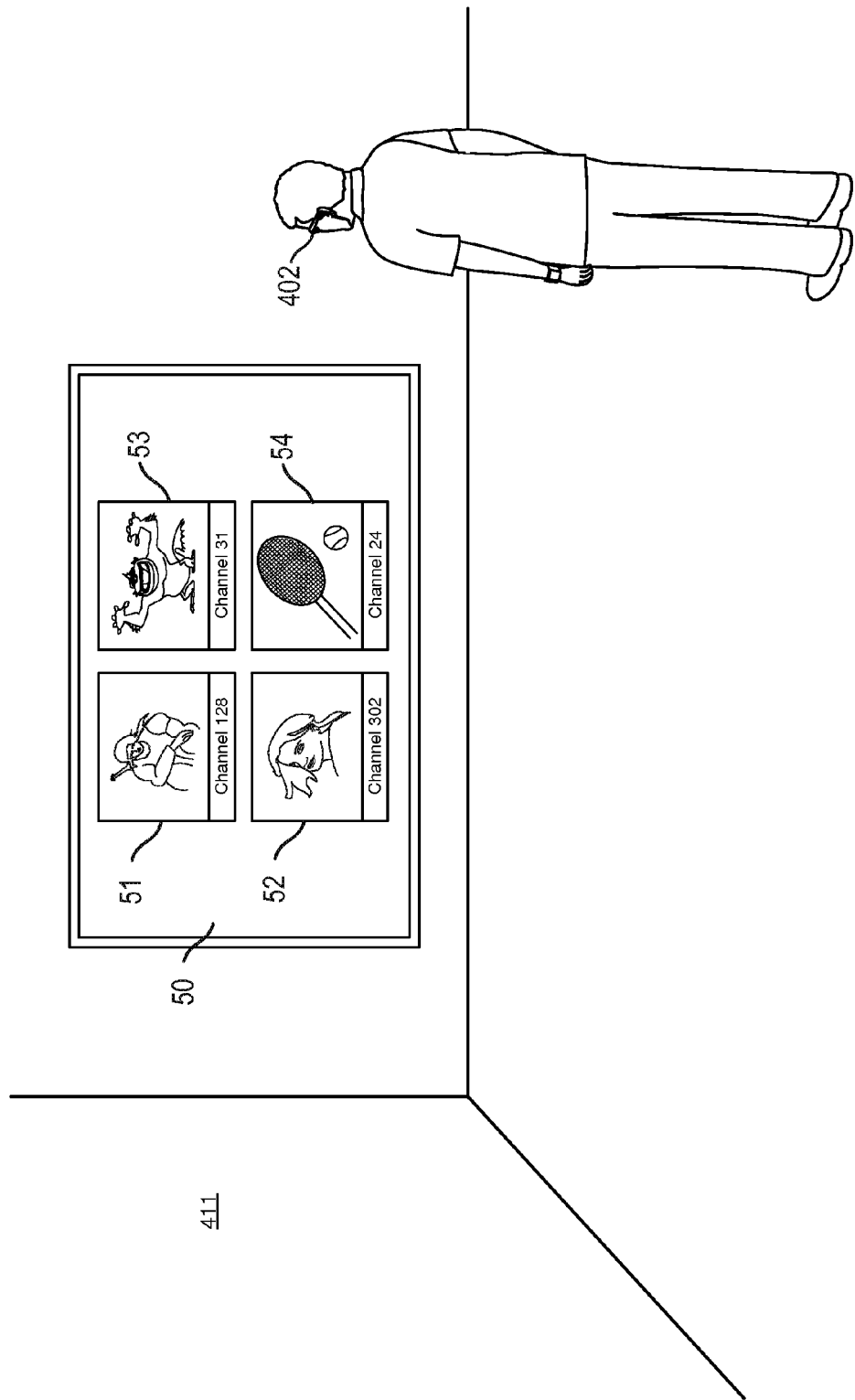
FIG. 4B depicts one embodiment of an augmented reality environment as viewed by an end user of an HMD.

FIG. 4B depicts one embodiment of an augmented reality environment 411 as viewed by an end user of an HMD 402. The HMD 402 may comprise a mobile device, such as mobile device 19 in FIG. 1. The augmented reality environment 411 may include a real electronic display 50 attached to a real-world wall within the augmented reality environment. As depicted, the real electronic display 50 displays four images 51-54 associated with four television channels that may be displayed on the real electronic display 50. In one embodiment, the end user of the HMD 402 may select a first channel of the four television channels displayed on the real electronic display 50 by gazing at an image associated with the first channel (e.g., image 51) for a first period of time and then performing a particular head movement while gazing at the image associated with the first channel.

In some embodiments, an end user of a tablet computer may view an electronic display of the tablet computer displaying images associated with various computing applications and perform head movements in order to select one of the computing applications. In one example, the end user's head movements and the presence of a VOR while performing the head movements may be detected using an HMD worn by the end user. In another example, the tablet computer may include a front facing camera for capturing images of the end user (e.g., using a high-quality RGB camera and/or a depth camera) and may detect that the end user has gazed upon a particular image associated with one of the computing applications for a first period of time and then performed a particular head movement (or gesture) associated with selecting a computing application based on the captured image of the end user. In this case, image processing techniques may be applied to the captured images of the end user in order to detect the presence of a VOR. In another embodiment, a computing system (e.g., a gaming console) in communication with a display and a capture device for capturing color and/or depth images of an environment may cause one or more images of the end user to be captured by the capture device. The computing system may then detect that the end user has gazed upon a particular image displayed on the display for a first period of time and then performed a particular head movement (or other gesture) associated with selecting an application corresponding with the particular image based on the one or more images of the end user. The computing system may apply image processing techniques to the one or more images of the end user in order to detect the presence of a VOR during the particular head movement.

Figure 5:
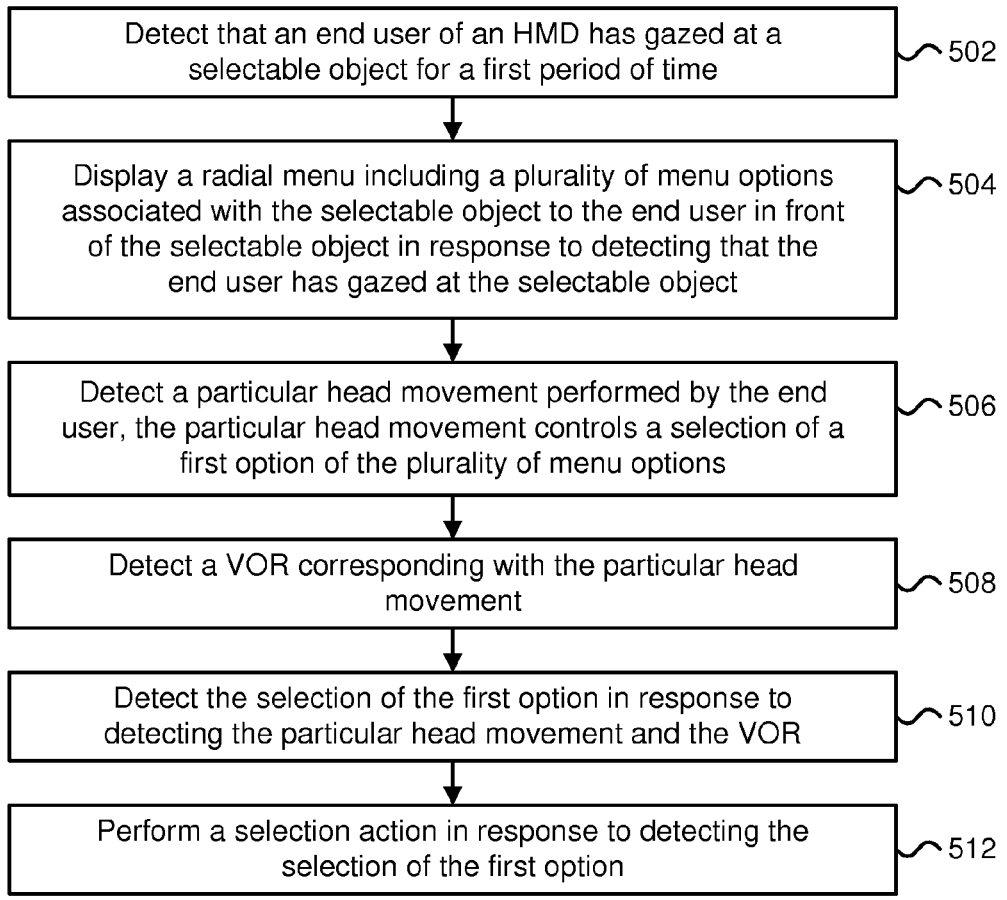
FIG. 5 is a flowchart describing one embodiment of a method for selecting an object within an augmented reality environment.

FIG. 5 is a flowchart describing one embodiment of a method for selecting an object within an augmented reality environment. In one embodiment, the process of FIG. 5 may be performed by a mobile device, such as mobile device 19 in FIG. 1.

In step 502, it is detected that an end user of an HMD has gazed at a selectable object for a first period of time (e.g., two seconds). The selectable object may comprise a real object (e.g., a real television) or a virtual object (e.g., a virtual television) within an augmented reality environment. The selectable object may comprise an image displayed to the end user using an electronic display (e.g., a tablet computer display). For example, the image displayed to the end user using the electronic display may comprise an image associated with opening a computing application, an electronic folder for storing files, or a live tile that displays real-time information associated with a computing application (e.g., a weather application or a news application).

In one embodiment, the first period of time during which the end user remains fixated on the selectable object may depend on a size of the selectable object. In one example, a smaller selectable object within an augmented reality environment occupying a viewing angle less than a threshold angle (e.g., less than two degrees) or less than a viewing area less than a threshold area (e.g., less than one square inch) may require a longer fixation time than that used for a larger selectable object.

In step 504, a radial menu including a plurality of menu options associated with the selectable object is displayed to the end user in front of the selectable object or in proximity to the selectable object (e.g., surrounding the selectable object). The radial menu may be displayed in response to detecting that the end user has gazed at the selectable object for at least the first period of time. The radial menu may display various options associated with the selectable object. In one example, a selectable object may correspond with a computing application and the various options may include a first option for displaying properties associated with the computing application, a second option for deleting the computing application, and a third option for opening the computing application. In another example, a selectable object may correspond with a particular person (or the particular persons' face) and the various options may include a first option to send a message to the particular person (e.g., an email message or a text message), a second option for opening a speech recognition application in order to compose a reminder message, and a third option for capturing an image of the particular person.

In step 506, a particular head movement performed by the end user is detected. The particular head movement may control a selection of a first option of the plurality of menu options. In one embodiment, the particular head movement may involve the end user moving their head away from a direction of the selectable object at a head speed that is greater than a threshold head speed while gazing at the selectable object. In another embodiment, the particular head movement may involve the end user moving their head away from a direction of the selectable object by at least a particular angle (e.g., more than ten degrees) within a particular period of time (e.g., 250 ms) while gazing at the selectable object.

To select the selectable object, the end user may gaze at the selectable object for the first period of time (e.g., three seconds) and then immediately perform the particular head movement while gazing at the selectable object. In one example, the particular head movement may comprise the end user moving their head's orientation away from the direction of the selectable object at a speed that is greater than a threshold speed while maintaining their gaze upon the selectable object and then returning their head's orientation back to the direction of the selectable object while maintaining their gaze upon the selectable object. The particular head movement may comprise one or more vertical movements and/or one or more horizontal movements. As the end users head orientation moves away from the direction of the selectable object, a first VOR may be detected. Furthermore, as the end user's head orientation moves back towards the direction of the selectable object, a second VOR may be detected. In this case, the presence of the first VOR and/or the second VOR may be used to detect that the end user has been focusing on the selectable object while performing the particular head movement.

In step 508, a VOR corresponding with the particular head movement is detected. In one embodiment, the VOR may be detected based on the movement of a gaze vector associated with movement of the end user's eyes relative to a head vector associated with movement of the end user's head. In one example, if the gaze vector moves in a direction opposite to the head vector during a portion of the particular head movement, then the VOR may be deemed to have been detected. By correlating the movements of the gaze vector with the movements of the head vector, it may be determined that an end user has maintained looking at the selectable object while performing the particular head movement.

In some cases, a gaze vector may correspond with the end user's dominant eye and the VOR may be detected for the end user's dominant eye. In other cases, a gaze vector may correspond with the end user's eye that is closest to the selectable object being viewed by the end user and the VOR may be detected for the end user's eye that is closest to the selectable object. In some cases, a first gaze vector associated with a left eye of the end user and a second gaze vector associated with a right eye of the end user may be combined using a weighted combination that weighs the gaze vector associated with the end user's eye that is closest to the selectable object more heavily than the gaze vector associated with the end user's eye that is farthest from the selectable object.

In step 510, the selection of the first option is detected in response to detecting the particular head movement and the VOR. In step 512, a selection action is performed in response to detecting the selection of the first option. In one example, if the first option is associated with a camera option, then the selection action may comprise the capturing of an image or video of the selectable object or a portion of an augmented reality environment in which the selectable object exists. In another example, if the first option is associated with a messaging application, then the selection action may comprise the opening of a virtual window for entering a message (e.g., using speech recognition) and for sending the message to an intended recipient.

Figure 6A:
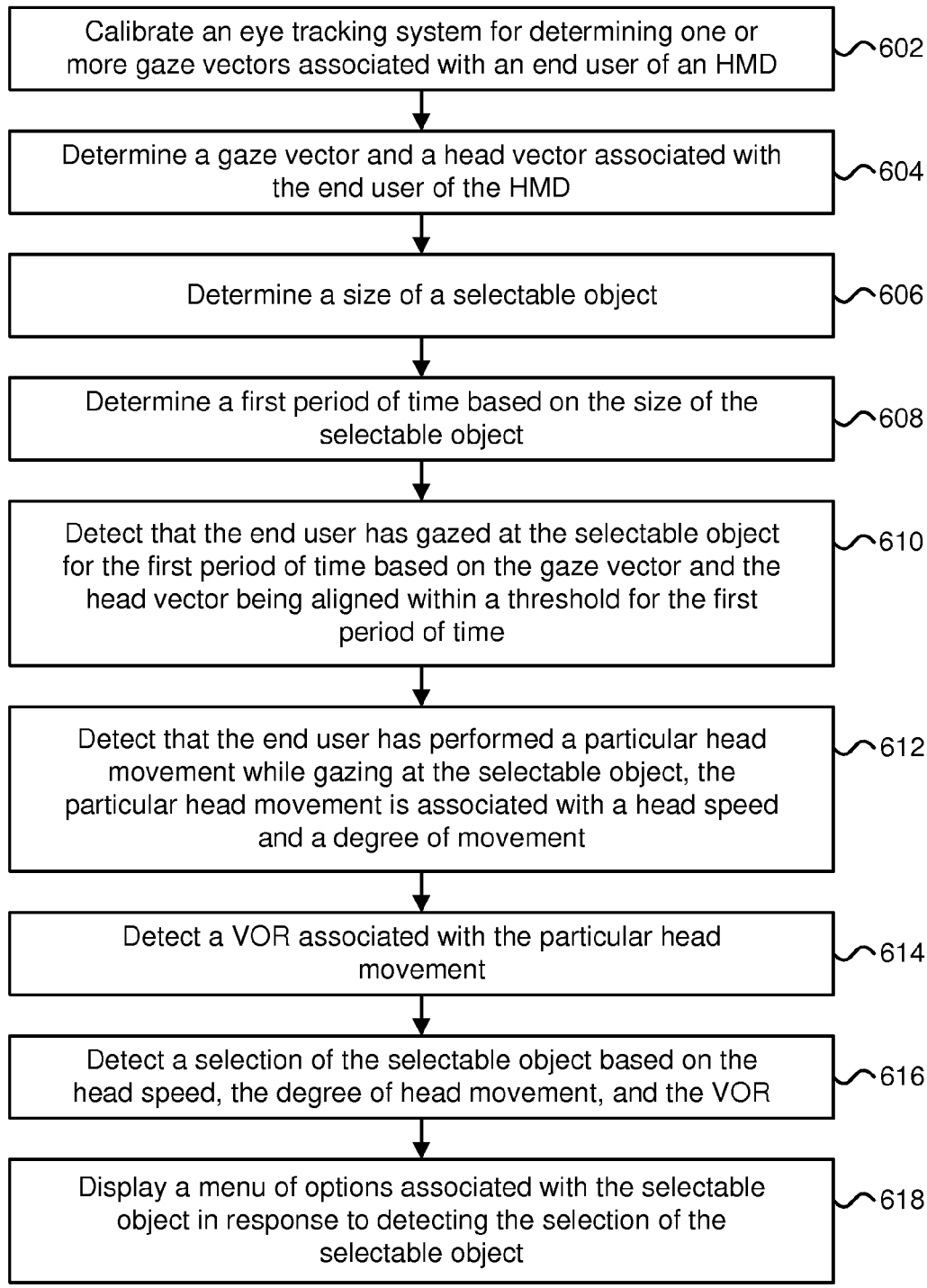
FIG. 6A is a flowchart describing one embodiment of a method for selecting an object within an augmented reality environment based on the detection of a VOR.

FIG. 6A is a flowchart describing one embodiment of a method for selecting an object within an augmented reality environment based on the detection of a VOR. In one embodiment, the process of FIG. 6A may be performed by a mobile device, such as mobile device 19 in FIG. 1.

In step 602, an eye tracking system for determining one or more gaze vectors associated with an end user of an HMD is calibrated. The eye tracking system may be calibrated in order to align where the end user is looking with where the eye tracking system thinks the end user is looking. The calibration procedure may include presenting target images at fixed locations at different times to the end user and computing a set of transform equations to align the eye tracking system with the end user's point of gaze. In one example, the end user may be asked to look at different points within an augmented reality environment at different times or to track a target image that moves within the augmented reality environment over time.

In one embodiment, a target image (e.g., an image of a red ball) may be provided at a fixed location within an augmented reality environment and the end user may be asked to move their head around while maintaining their gaze upon the target image. In one example, a world-locked virtual object may be presented to the end user of an HMD and the end user may be asked to perform various head movements such as moving their head away from the direction of the virtual object and then returning back to the direction of the virtual object using various angles (e.g., moving their head left and right, up and down, and shaking their head at different angles while gazing at the virtual object). In another example, the calibration procedure may include displaying a target object at a fixed location within an augmented reality environment to the end user and then capturing images of the end user's eyes as the end user moves their head away from a direction of the target object while maintaining their gaze upon the target object. One benefit of using a fixed world-locked object and then asking the end user to move their head around while maintaining eye contact with the object is that the end user can control the speed at which the calibration process occurs. A long calibration process may tire out an end users eyes and reduce their ability to focus on an object during the calibration process.

In step 604, a gaze vector and a head vector associated with the end user of the HMD are determined. In some embodiments, eye tracking may be used to determine the gaze vector and head tracking may be used to determine the head vector. In step 606, a size of a selectable object is determined. In step 608, a first period of time is determined based on the size of the selectable object. In one example, a smaller selectable object within an augmented reality environment occupying a viewing angle less than a threshold angle (e.g., less than two degrees) or less than a viewing area less than a threshold area (e.g., less than one square inch) may require a longer fixation time than that used for a larger selectable object.

In step 610, it is detected that the end user has gazed at the selectable object for the first period of time based on the gaze vector and the head vector being aligned within a threshold (e.g., within three degrees) for the first period of time. The selectable object may comprise a real object (e.g., a real television) or a virtual object (e.g., a virtual television) within an augmented reality environment. In step 612, it is detected that the end user has performed a particular head movement while gazing at the selectable object. The particular head movement may correspond with a selection gesture for selecting objects. The particular head movement may be associated with a head speed (or other metric for how fast the particular head movement was) and a degree of movement (or other metric for how far the particular head movement deviated from the initial head position prior to the end user performing the particular head movement).

In step 614, a VOR associated with the particular head movement is detected. In one embodiment, the VOR may be detected based on the movement of the gaze vector relative to the head vector over a portion of the time during which the end user performed the particular head movement (e.g., during the first 250 ms of the particular head movement). In one example, if the gaze vector moved in a direction opposite to the head vector during a portion of the particular head movement, then the VOR may be deemed to have been detected. In some cases, the gaze vector may correspond with the end user's dominant eye and the VOR may be detected for the end user's dominant eye. In other cases, the gaze vector may correspond with the end user's eye that is closest to the selectable object being viewed by the end user and the VOR may be detected for the end user's eye that is closest to the selectable object.

In step 616, a selection of the selectable object is detected based on the head speed, the degree of head movement, and the VOR. In one embodiment, a selection of the selectable object may be detected if the particular head movement corresponds with a selection gesture and the head speed is greater than a threshold speed. In another embodiment, a selection of the selectable object may be detected if the particular head movement corresponds with a selection gesture and the degree of head movement is greater than a threshold angle. In step 618, a menu of options associated with the selectable object is displayed in response to detecting the selection of the selectable object. In one embodiment, the menu of options may be displayed to the end user using a radial menu, such as radial menu 40 and FIG. 4A.

Figure 6B:
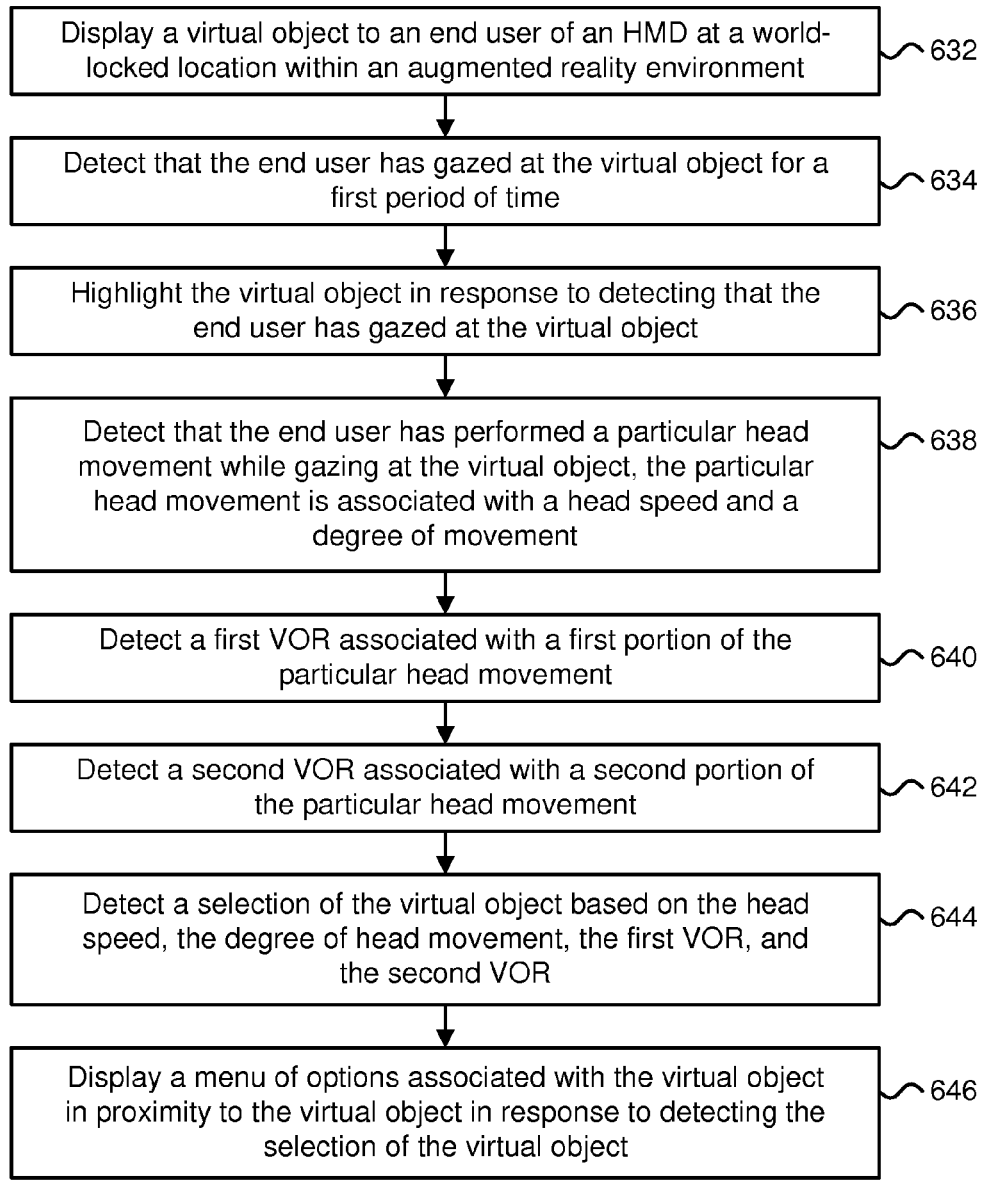
FIG. 6B is a flowchart describing an alternative embodiment of a method for selecting an object within an augmented reality environment based on the detection of a VOR.

FIG. 6B is a flowchart describing an alternative embodiment of a method for selecting an object within an augmented reality environment based on the detection of a VOR. In one embodiment, the process of FIG. 6B may be performed by a mobile device, such as mobile device 19 in FIG. 1.

In step 632, a virtual object is displayed to an end user of an HMD at a world-locked location within an augmented reality environment. The virtual object may appear to maintain a coherent spatial relationship within the augmented reality environment at the world-locked location as the end user of the HMD moves within the augmented reality environment. The virtual object may comprise a virtual television (e.g., located on a wall) or a virtual electronic display. In step 634, it is detected that the end user has gazed at and maintained their gaze at the virtual object for a first period of time (e.g., two seconds). In one embodiment, the first period of time during which the end user remains fixated on the virtual object may depend on a size of the virtual object. In one example, a smaller virtual object within an augmented reality environment occupying a viewing angle less than a threshold angle (e.g., less than two degrees) or less than a viewing area less than a threshold area (e.g., less than one square inch) may require a longer fixation time than that used for a larger virtual object. In one example, the first period of time for a virtual object occupying a viewing angle less than two degrees may be set to three seconds, while the first period of time for a virtual object occupying a viewing angle greater than or equal to two degrees may be set to two seconds.

In step 636, the virtual object is highlighted in response to detecting that the end user has gazed at the virtual object. In one embodiment, a border of the virtual object may be highlighted or colored (e.g., displaying an orange border around the virtual object) in order to indicate that the virtual object is a selectable object. In some cases, the virtual object may be highlighted prior to detecting that the end user gazed at and maintained their gaze at the virtual object for the first period of time (e.g., after the end user has looked at the virtual object for one second). In other cases, the virtual object may be highlighted after the end user has gazed at the virtual object for the first period of time.

In step 638, it is detected that the end user has performed a particular head movement while gazing at the virtual object. The particular head movement may correspond with a head gesture for selecting virtual objects and may correspond with a head speed (e.g., corresponding with how fast the end user has moved their head away from a direction of the virtual object) and a degree of movement (e.g., corresponding with a change in orientation associated with the end user's head movement). In one embodiment, the particular head movement may involve the end user moving their head away from a direction of the virtual object at a head speed that is greater than a threshold speed while gazing at the virtual object. In another embodiment, the particular head movement may involve the end user moving their head away from a direction of the virtual object by at least a particular angle (e.g., more than 45 degrees) within a particular period of time (e.g., 750 ms) while gazing at the virtual object.

In some cases, in order to select the virtual object, the end user may gaze at a portion of the virtual object for at least two seconds and then immediately perform the particular head movement while gazing at the virtual object. In one example, the particular head movement may comprise the end user moving their head's orientation away from the direction of the virtual object at a speed that is greater than a threshold speed while maintaining their gaze upon the virtual object and then returning their head's orientation back to the direction of the virtual object while maintaining their gaze upon the virtual object.

In step 640, a first VOR associated with a first portion of the particular head movement is detected. The first VOR may be detected while the end user's head moves away from a direction of the virtual object. In step 642, a second VOR associated with a second portion of the particular head movement is detected. The second VOR may be detected while the end user's head moves towards the direction of the virtual object. In some embodiments, the first VOR may be associated with the end user moving their head in a first direction and the second VOR may be associated with the end user moving their head in a second direction that is opposite to the first direction. The first VOR and the second VOR may be detected based on the movement of a gaze vector associated with movement of the end user's eyes relative to a head vector associated with movement of the end user's head. In one example, if the gaze vector moves in a direction opposite to the head vector during a portion of the particular head movement, then the VOR may be deemed to have been detected.

In step 644, a selection of the virtual object is detected based on the head speed, the degree of head movement, the first VOR, and the second VOR. In one embodiment, the selection of the virtual object is detected if the head speed is greater than a threshold head speed, the degree of head movement is greater than a particular angle, and both the first VOR and the second VOR have been detected. In step 646, a menu of options associated with the virtual object is displayed in proximity to the virtual object in response to detecting the selection of the virtual object. The menu of options may be displayed to the end user using a radial menu overlaying the virtual object.

One embodiment of the disclosed technology includes one or more processors in communication with a display (e.g., a see-through display). The one or more processors detect that an end user of an electronic system or an electronic device (e.g., an HMD) has gazed at a selectable object for a first period of time. The one or more processors detect that the end user has performed a particular head movement while gazing at the selectable object subsequent to detecting that the end user has gazed at the selectable object for the first period of time. The one or more processors detect that the end user has performed the particular head movement by detecting a first vestibulo-ocular reflex during a first portion of the particular head movement. The one or more processors detect a selection of the selectable object based on detecting that the end user has performed the particular head movement while gazing at the selectable object. The one or more processors cause one or more options associated with the selectable object to be displayed using the see-through display in response to detecting the selection of the selectable object.

One embodiment of the disclosed technology includes detecting that an end user of an HMD has gazed at a selectable object for a first period of time and detecting that the end user has performed a particular head movement while gazing at the selectable object subsequent to detecting that the end user has gazed at the selectable object for the first period of time. The detecting that the end user has performed the particular head movement includes detecting a first vestibulo-ocular reflex during a first portion of the particular head movement. The method further comprises detecting a selection of the selectable object based on detecting that the end user has performed the particular head movement while gazing at the selectable object and displaying one or more options associated with the selectable object in response to detecting the selection of the selectable object.

One embodiment of the disclosed technology includes detecting that an end user of an HMD has gazed at a virtual object for at least a first period of time, determining a gaze vector and a head vector associated with the end user of the HMD, and detecting that the end user has performed a particular head movement while gazing at the virtual object subsequent to detecting that the end user has gazed at the virtual object. The detecting that the end user has performed the particular head movement includes detecting a first vestibulo-ocular reflex during a first portion of the particular head movement. The detecting a first vestibulo-ocular reflex includes determining that the gaze vector has moved in a first direction and the head vector has moved in a second direction opposite to the first direction during the first portion of the particular head movement. The method further comprises detecting a selection of the virtual object based on detecting that the end user has performed the particular head movement while gazing at the virtual object and displaying one or more options associated with the virtual object in response to detecting the selection of the virtual object.

Figure 7:
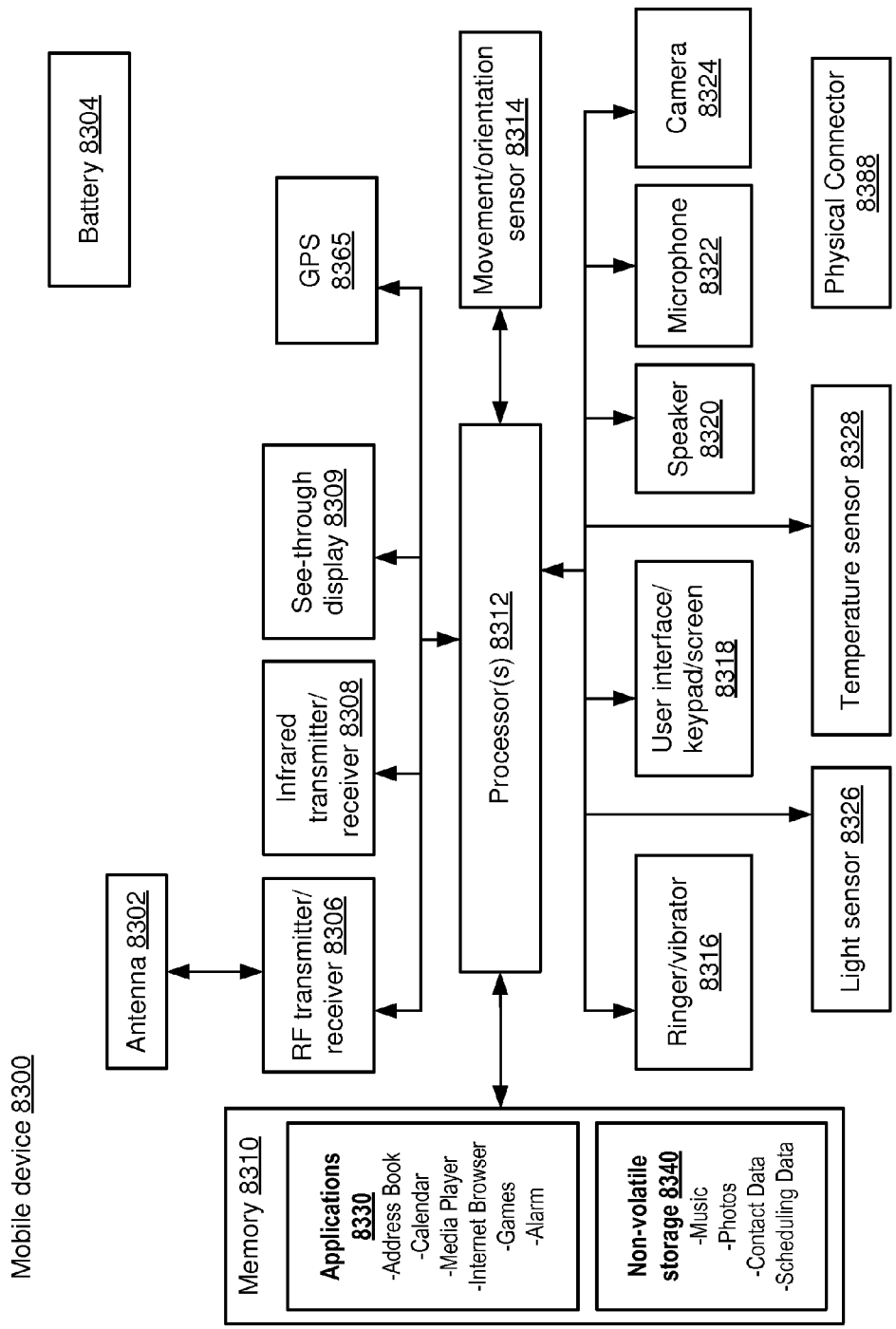
FIG. 7 is a block diagram of one embodiment of a mobile device.

FIG. 7 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a microelectromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic system, comprising: a display; and one or more processors configured to detect that an end user of the electronic system has gazed at a selectable object displayed on the display for a first period of time and detect that the end user has performed a particular head movement while gazing at the selectable object, the selectable object comprises a virtual object, the one or more processors configured determine that the end user has gazed at the virtual object for the first period of time and subsequently to detect at least two vestibulo-ocular reflexes during the particular head movement, the one or more processors configured to determine a selection of the selectable object in response to detecting the at least two vestibulo-ocular reflexes during the particular head movement, the at least two vestibulo-ocular reflexes includes a first vestibulo-ocular reflex that occurs during a first portion of the particular head movement and a second vestibulo-ocular reflex that occurs during a second portion of the particular head movement, the first portion of the particular head movement corresponds with the end user moving their head in a first direction and the second portion of the particular head movement corresponds with the end user moving their head in a second direction that is opposite to the first direction, the one or more processors configured to determine a size of the selectable object and determine the first period of time based on the size of the selectable object.

2. The electronic system of claim 1, wherein: the electronic system comprises an UMID.

3. The electronic system of claim 1, wherein: the particular head movement is associated with a head speed and a degree of movement, the one or more processors configured to determine the selection of the selectable object based on the head speed and the degree of head movement.

4. The electronic system of claim 1, wherein:
the one or more processors configured to determine a gaze vector and a head vector associated with the end user, the one or more processors configured to detect the first vestibulo-ocular reflex by detecting that the gaze vector has moved in a third direction and the head vector has moved in a fourth direction opposite to the third direction during the first portion of the particular head movement.

5. The electronic system of claim 1, wherein: the one or more processors configured to detect that the end user has performed the particular head movement by detecting the first vestibulo-ocular reflex during the first portion of the particular head movement and detecting the second vestibulo-ocular reflex during the second portion of the particular head movement.

6. The electronic system of claim 1, wherein: the one or more processors configured to cause one or more options associated with the selectable object to be displayed using the display in response to determining the selection of the selectable object.

7. The electronic system of claim 1, wherein: the one or more processors configured to determine a first eye of the end user that is closest to the selectable object and detect the first vestibulo-ocular reflex for the first eye of the end user that is closest to the selectable object, the first eye comprises the end user's left eye and the selectable object is positioned to the left of the end user.

8. A method for selecting objects within an augmented reality environment using an HMD, comprising:

detecting that an end user of the HMD has gazed at a selectable object displayed using the HMD for a first period of time;

determining the first period of time based on a size of the selectable object displayed using the HMD;

detecting that the end user has performed a particular head movement while gazing at the selectable object, the detecting that the end user has performed the particular head movement includes determining that the end user has gazed at the selectable object for the first period of time, and subsequently detecting at least two vestibulo-ocular reflexes during the particular head movement, the at least two vestibulo-ocular reflexes includes a first vestibulo-ocular reflex that occurs during a first portion of the particular head movement and a second vestibulo-ocular reflex that occurs during a second portion of the particular head movement, the detecting that the end user has performed the particular head movement includes detecting the first vestibulo-ocular reflex during the first portion of the particular head movement and detecting a second vestibulo-ocular reflex during the second portion of the particular head movement, the first portion of the particular head movement corresponds with the end user moving their head in a first direction and the second portion of the particular head movement corresponds with the end user moving their head in a second direction that is opposite to the first direction;

detecting a selection of the selectable object in response to detecting the at least two vestibulo-ocular reflexes during the particular head movement; and displaying one or more options associated with the selectable object in response to detecting the selection of the selectable object.

9. The method of claim 8, wherein: the particular head movement is associated with a head speed and a degree of movement; and the detecting a selection of the selectable object includes detecting the selection of the selectable object based on the head speed and the degree of head movement.

10. The method of claim 8, further comprising: determining a gaze vector and a head vector associated with the end user of the HMID, the detecting the at least two vestibulo-ocular reflexes includes determining that the gaze vector has moved in a first direction and the head vector has moved in a second direction opposite to the first direction during a first portion of the particular head movement.

11. The method of claim 8, wherein: the particular head movement comprises the end user moving their head's orientation away from a direction of the selectable object at a head speed that is greater than a threshold speed while maintaining their gaze upon the selectable object and then returning their head's orientation back to the direction of the object while maintaining their gaze upon the selectable object.

12. The method of claim 8, wherein: the detecting at least two vestibulo-ocular reflexes includes determining a first eye of the end user that is closest to the selectable object and detecting the first vestibulo-ocular reflex for the first eye of the end user that is closest to the selectable object, the first eye comprises the end user's left eye and the selectable object is positioned to the left of the end user.

13. The method of claim 8, wherein: the displaying one or more options includes displaying a radial menu including the one or more options overlaying the selectable object.

14. The method of claim 8, further comprising: calibrating an eye tracking system of the HMD for determining one or more gaze vectors associated with the end user of the HMD prior to detecting that the end user of the HMD has gazed at the selectable object for the first period of time, the calibrating includes displaying a target object at a fixed location within an augmented reality environment to the end user and then capturing images of the end user's eyes as the end user moves their head away from a direction of the target object while maintaining their gaze upon the target object.

15. One or more storage devices containing processor readable code for programming one or more processors to perform a method for selecting a virtual object within an augmented reality environment using an HMD comprising the steps of:

detecting that an end user of the HMD has gazed at the virtual object for at least a first period of time;

determining the first period of time based on a size of the virtual object;

determining a gaze vector and a head vector associated with the end user of the HMD;

determining a first eye of the end user of the HMD that is closest to the virtual object;

detecting that the end user has performed a particular head movement while gazing at the virtual object, the detecting that the end user has performed the particular head movement includes determining that the end user has gazed at the virtual object for at least the first period of time and subsequently detecting at least two vestibulo-ocular reflexes during the particular head movement, the detecting at least two vestibulo-ocular reflexes includes determining that the gaze vector has moved in a first direction and the head vector has moved in a second direction opposite to the first direction during the particular head movement, the at least two vestibulo-ocular reflexes includes a first vestibulo-ocular reflex that occurs during a first portion of the particular head movement and a second vestibulo-ocular reflex that occurs during a second portion of the particular head movement, the detecting that the end user has performed a particular head movement includes detecting the first vestibulo-ocular reflex for the first eve during the first portion of the particular head movement and detecting the second vestibulo-ocular reflex for the first eye during the second portion of the particular head movement;

detecting a selection of the virtual object in response to detecting the at least two vestibulo-ocular reflexes during the particular head movement; and displaying one or more options associated with the virtual object in response to detecting the selection of the virtual object.

16. The one or more storage devices of claim 15, wherein:

the first portion of the particular head movement corresponds with the end user moving their head in the first direction and the second portion of the particular head movement corresponds with the end user moving their head in the second direction that is opposite to the first direction.

* * * * *